(12) United States Patent
Maeda et al.

(10) Patent No.: US 7,236,689 B2
(45) Date of Patent: Jun. 26, 2007

(54) DATA RECORDING/REPRODUCING APPARATUS AND DATA RECORDING/REPRODUCING METHOD

(75) Inventors: Hiroshi Maeda, Kanagawa (JP); Kenji Kakinoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 839 days.

(21) Appl. No.: 10/470,424

(22) PCT Filed: Nov. 11, 2002

(86) PCT No.: PCT/JP02/11735

§ 371 (c)(1),
(2), (4) Date: Jul. 28, 2003

(87) PCT Pub. No.: WO03/049111

PCT Pub. Date: Jun. 12, 2003

(65) Prior Publication Data

US 2004/0197089 A1 Oct. 7, 2004

(30) Foreign Application Priority Data

Nov. 30, 2001 (JP) .............................. 2001-367860

(51) Int. Cl.
*H04N 7/64* (2006.01)
(52) U.S. Cl. ........................................ 386/113; 386/95
(58) Field of Classification Search .................. 386/46, 386/95, 113; 707/200, 202; 714/5, 15, 42; 715/48, 63, 758
See application file for complete search history.

(56) References Cited

U.S. PATENT DOCUMENTS

| | | | | |
|---|---|---|---|---|
| 4,852,100 A | * | 7/1989 | Christensen et al. | 714/763 |
| 5,241,672 A | * | 8/1993 | Slomcenski et al. | 707/202 |
| 5,274,646 A | * | 12/1993 | Brey et al. | 714/758 |
| 5,974,563 A | * | 10/1999 | Beeler, Jr. | 714/5 |
| 6,158,025 A | * | 12/2000 | Brisse et al. | 714/48 |
| 6,205,558 B1 | * | 3/2001 | Sobel | 714/15 |
| 6,292,625 B1 | * | 9/2001 | Gotoh et al. | 386/95 |
| 6,308,005 B1 | * | 10/2001 | Ando et al. | 386/95 |
| 6,701,451 B1 | * | 3/2004 | Cohen et al. | 714/5 |
| 6,701,454 B1 | * | 3/2004 | Fischer et al. | 714/15 |
| 6,839,868 B1 | * | 1/2005 | Pignol | 714/42 |
| 7,016,599 B2 | * | 3/2006 | Van Gestel et al. | 386/95 |
| 7,089,267 B2 | * | 8/2006 | Kageyama et al. | 707/200 |

FOREIGN PATENT DOCUMENTS

JP        10-177769        6/1998

(Continued)

*Primary Examiner*—Thai Q. Tran
*Assistant Examiner*—Mishawn Dunn
(74) *Attorney, Agent, or Firm*—Frommer Lawrence & Haug LLP; William S. Frommer

(57) ABSTRACT

The present invention provides a digital camera for recording image data to a recording medium, which includes an image signal processor, a recording and reproducing unit having an Optical Pickup unit, and a control unit for managing files having a sequence of data stored therein based on a virtual allocation table showing correspondence between actual addresses indicative of recording positions of the files on the recording medium and virtual addresses indicative of virtual recording positions of the files. When interruption of recording processing of data due to discontinuance of drive power supply, uncovering of a cover, impact, etc. is detected, the control unit retrieves and reads out restoration file information, and restores a file whose recording processing is interrupted based on the restoration file information.

18 Claims, 4 Drawing Sheets

FOREIGN PATENT DOCUMENTS

| | | |
|---|---|---|
| JP | 11-259957 | 9/1999 |
| JP | 2000-113602 | 4/2000 |
| JP | 2000-215644 | 8/2000 |
| JP | 2001-167558 | 6/2001 |
| JP | 2001-243632 | 9/2001 |
| JP | 2001-266496 | 9/2001 |
| JP | 2001-291366 | 10/2001 |
| JP | 2002-312940 | 10/2002 |

* cited by examiner

| EXTENT Ex1 | EXTENT Ex2 | EXTENT Ex3 | EXTENT Ex4 | DirICB,FileICB, VAT ICB |

FIG.4A

| EXTENT Ex1 | EXTENT Ex2 | EXTENT Ex3 |

↑ INTERRUPTION

FIG.4B

| EXTENT Ex1 | EXTENT Ex2 | EXTENT Ex3 | ▨▨▨ | DirICB,FileICB, VAT ICB |

FIG.4C

DATA RECORDING/REPRODUCING APPARATUS AND DATA RECORDING/REPRODUCING METHOD

TECHNICAL FIELD

The present invention relates to an apparatus and method for recording and reproducing data and a digital camera which additionally record data to a recording medium, in particular, to an apparatus and method for recording and reproducing data and a digital camera which, even though writing processing is interrupted during recording processing, can restore data before the interruption.

This application claims priority of Japanese Patent Application No. 2001-367860, filed on Nov. 30, 2001 in Japan, the entirety of which is incorporated by reference herein.

BACKGROUND ART

As an optical recording medium which can optically read out data, a disc-shaped recording medium (referred to as optical disc, hereinafter) such as a CD (Compact Disc) has been used. This kind of optical disc has large storage capacity and can realize random accessing. In reading out data which is optically recorded on an optical disc, since an optical read-out unit is not brought into contact with an optical disc, there is caused little fear that the recording medium and optical read-out unit are caused to be worn out or damaged due to contact between the recording medium and optical read-out unit, which may be raised in the case of using a magnetic tape as a recording medium. Since an optical disc has a protective layer made of synthetic resin formed on a surface thereof so as to protect the signal recording layer, there is little fear that data is lost by mistake as compared with the case using a magnetic tape. So, an optical disc which has much advantage as compared with a recording medium such as a magnetic tape is an excellent recording medium adopted for storing data processed in an information processing apparatus such as a personal computer.

Recently, recording and reproducing apparatuses using an optical disc capable of recording data such as a CD-R (Compact Disc-Recordable), CD-RW (Compact Disc-Rewritable) have been developed. Among those, there are recording and reproducing apparatuses which can easily perform writing processing corresponding to all standard formats used in compact discs such as a CR-ROM, CR-ROM/XA, CD-I, CD-DA. Having replaced a conventional magnetic tape or magnetic disc, a CD-R is arranged in a electronic apparatus and is used as a recording medium for recording data processed in the electronic apparatus.

As a standard concerning recording and/or reproducing data using an optical disc, there is known the UDF (Universal Disc Format) established by the OSTA (Optical Storage Technology Association) of the United States.

A recording medium conforming to the UDF employs the packet writing in writing data. Employing the packet writing, data is written in the packet configuration in which one link block and four Run-In areas are arranged before the data area and two Run-Out areas are arranged after the data area. So, seven blocks other than the data area are used as linking recording areas (referred to as Linking Area, hereinafter) being linking areas between adjacent packets.

In a file system conforming to additional recording of the UDF, management information of a directory and a file is indirectly managed using an FID (File Identifier Descriptor), a VAT (Virtual Allocation Table), a File Entry ICB (File Entry Information Control Block), etc., instead of being directly managed using a real recording position (real address).

The VAT is a technique to manage real addresses where files are really recorded and virtual addresses corresponding to the real addresses, forming a correspondence table. Employing the VAT, when additionally recording data to a recording medium, the recording medium is processed as if its arbitrary address on the recording medium is accessed so as to update or reproduce data.

That is, in the UDF, position information of directories and files is indirectly referred to. The VAT is freely arranged in the packet configuration, while a VAT ICB (Virtual Allocation Table Information Control Block) indicating the VAT is necessarily arranged at a position returning from the final sector recorded on a recording medium by the Linking Area. So, in the UDF, virtual addresses can be converted to real addresses by reading out the VAT indicated by the VAT ICB.

In the UDF, a string of logical sectors in which writing/reading out of data is performed is referred to as an extent, and start addresses of respective extents are retained as file information and are additionally recorded together with file system information to be updated.

Generally, in additionally recording image file data etc. to an optical disc, after image data is written, following a sequence of image data object, file information concerning the sequence of image data is written, as has been described above. So, since file information and file system information is recorded to the end of an extent, the file information and file system information cannot be recorded to a recording medium such as an optical disc unless writing processing of image data object is finished. In case there is no file information and file system information, or in case file information and file system information cannot be read out, since a reproducing apparatus cannot recognize a recording medium itself or respective data recorded on the recording medium, the recording medium cannot be used.

For example, in case of a recording medium such as a CD-R, when recording processing is interrupted due to discontinuance of drive power supply, uncovering of a cover arranged at a recording and reproducing apparatus which veils a recording medium, impact, etc. during recording processing, recording processing of file information cannot be completed. Thus, data which is recorded until recording processing is interrupted is caused to be unreadable, or an optical disc itself may be broken.

To cope with the situation in which thus recorded data is caused to be unreadable, there is proposed a restoration processing which restores such unreadable data to make the data readable to a certain extent. For example, there is a conventional restoration processing which retrieves file information forward and rerecord information in which damage is found. Employing this method, damaged data may be restored to be of the state before writing, while data which is interrupted during writing processing cannot be restored. That is, under the conventional restoration processing, once writing processing is interrupted, there is raised a problem that thus interrupted data cannot be accessed.

Furthermore, the larger the size of data such as a moving picture file or non-compressed still picture data becomes, the longer it takes to perform writing processing. Thus, there is raised much possibility of interruption of writing processing due to accidental factors during writing processing. Moreover, the larger the size of data becomes, the more lost data there is necessarily raised when writing processing is interrupted.

Especially, in case of recording original data which is not stored in advance, that is, recording real time data of such as moving pictures which is directly supplied from an image capturing apparatus, when an accident such as interruption of writing processing happens, not only data which is recorded during the interruption of recording processing is lost, but also data which is recorded before the interruption of recording processing is undesirably caused to be unreadable.

DISCLOSURE OF THE INVENTION

Accordingly, the present invention has an object to provide a new apparatus and method for recording and reproducing data and a digital camera which can overcome the above-mentioned drawbacks of the conventional apparatus and method for recording and reproducing data.

The present invention has another object to provide an apparatus and method for recording and reproducing data and a digital camera employing the method for recording and reproducing data which, even though there is raised failure in writing data, can make data before the interruption readable.

The above object can be attained by providing an apparatus for recording and reproducing data which manages files and records and/or reproduces data based on a virtual allocation table showing correspondence between actual addresses indicative of recording positions of the files on a recording medium and virtual addresses indicative of virtual recording positions of the files, the files having a sequence of data stored therein, the apparatus including:

record and reproduction means for recording and/or reproducing data to and/or from the recording medium; and record control means for controlling the processing of recording file information concerning a file including a sequence of data to a predetermined area of the recording medium as restoration file information when the record and reproduction means records the sequence of data;

wherein, when interruption of data recording processing is detected, the record control means retrieves and reads out restoration file information, and restores a file whose recording processing is interrupted based on the restoration file information.

According to the apparatus for recording and reproducing data, the record control means records file information concerning a file including a sequence of data to a predetermined area of the recording medium as restoration file information, and when interruption of data recording processing is detected, the record control means retrieves and reads out restoration file information, and restores a file whose recording processing is interrupted based on the restoration file information.

Also, the above object can be attained by providing a method for recording and reproducing data which manages files and records and/or reproduces data based on a virtual allocation table showing correspondence between actual addresses indicative of recording positions of the files on a recording medium and virtual addresses indicative of virtual recording positions of the files, the files having a sequence of data stored therein, the method including:

data record and restoration file information record step of recording a sequence of data, and recording file information concerning a file including the sequence of data to a predetermined area of the recording medium as restoration file information;

restoration file information read out step of retrieving and reading out restoration file information when data recording processing is interrupted at the data record step; and file restoration step of restoring a file whose recording processing is interrupted based on the restoration file information.

According to the method for recording and reproducing data, at the restoration file information record step, file information concerning a file including a sequence of data is recorded to a predetermined area of the recording medium as restoration file information, and at the data record step, when interruption of data recording processing is detected, restoration file information is retrieved and read out, and a file whose recording processing is interrupted is restored based on the restoration file information.

Also, the above object can be attained by providing a digital camera including:

image capturing means for capturing an object;

image processing means for processing captured image data;

record and reproduction means for recording and/or reproducing data to and/or from a recording medium; and record control means for managing files having a sequence of data stored therein based on a virtual allocation table showing correspondence between actual addresses indicative of recording positions of the files on the recording medium and virtual addresses indicative of virtual recording positions of the files, and controlling the processing of recording file information concerning a file including a sequence of data to a predetermined area of the recording medium as restoration file information when the record and reproduction means records the sequence of data;

wherein, when interruption of data recording processing is detected, the record control means retrieves and reads out restoration file information, and restores a file whose recording processing is interrupted based on the restoration file information.

According to the digital camera, the record control means records file information concerning a file including a sequence of data to a predetermined area of the recording medium as restoration file information, and when interruption of data recording processing is detected, the record control means retrieves and reads out restoration file information, and restores a file whose recording processing is interrupted based on the restoration file information.

These objects and other objects, features and advantages of the present invention will become more apparent from the following detailed description of the preferred embodiments of the present invention.

BRIEF DESCRIPTION OF THE DRAWINGS

FIGS. 4A to 4C show schematic views for explaining interruption of writing processing of extents and restoration of file information in the digital camera.

BEST MODE FOR CARRYING OUT THE INVENTION

The embodiment of a digital camera employing the present invention will further be described below with reference to the accompanying drawings.

The digital camera employing the present invention has a driver for additionally recording a data file to a recording medium, especially to a disc-shaped recording medium such as a CD-R (Compact Disc-Recordable), CD-RW (Compact Disc-Rewritable), etc., based on a file system conforming to the UDF (Universal Disc Format), and reproducing thus recorded data file. The digital camera is provided with an image capturing unit and captures an object using the image capturing unit, and records thus captured image data to a recording medium.

As a digital camera employing the present invention, specifically, there are a digital still camera capable of image capturing and recording a still picture and a non-compressed still picture, a digital camcorder and a digital video recorder capable of capturing and recording a moving picture, and a digital camera having these functions.

The digital camera employing the present invention has a recording and reproducing unit, and in recording a sequence of data, the recording and reproducing unit records file information concerning a file including the sequence of data to a predetermined area of a recording medium as restoration file information or file information for restoration. Thus, even though an accident such as interruption of writing processing happens, data before the interruption is made readable based on the restoration file information.

Figure 1A:
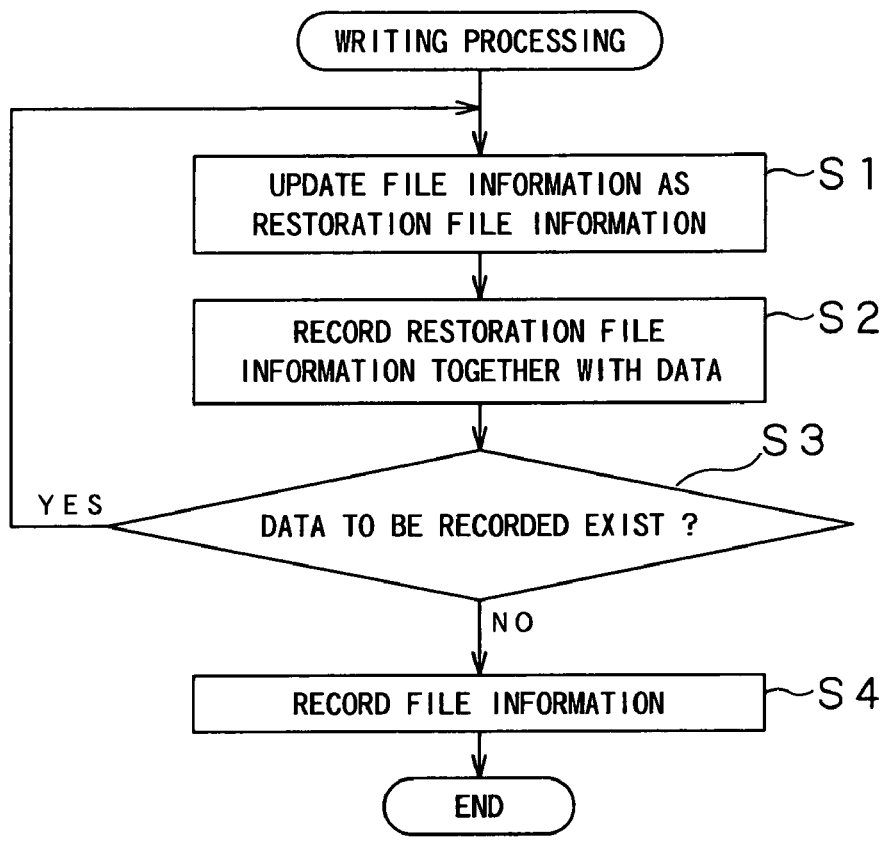
FIG. 1A shows a flow chart showing writing processing of image data.
Figure 1B:
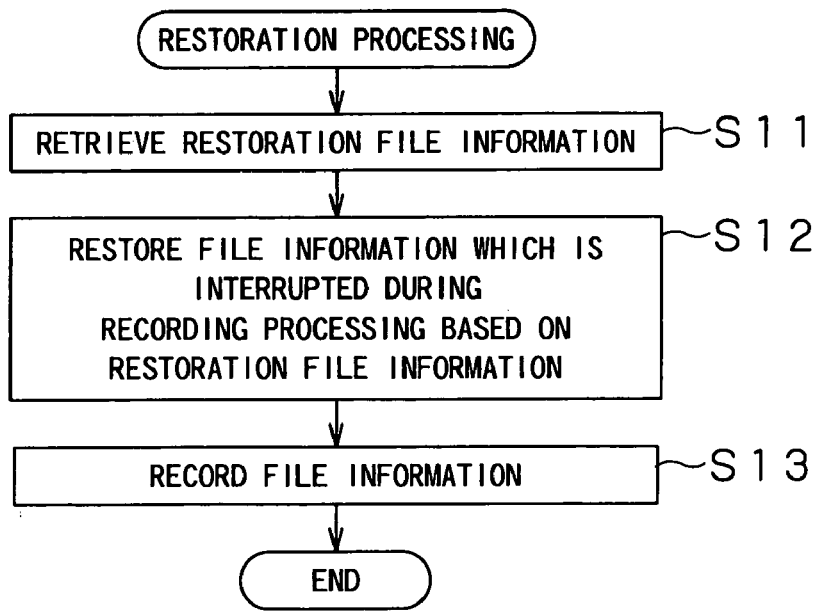
FIG. 1B shows a flow chart showing restoration processing of a file, in the digital camera employing the present invention.

That is, the digital camera employing the present invention restores a file by performing processing shown in FIG. 1A and FIG. 1B.

When the processing of writing captured image data to a recording medium starts, first in step S1, the digital camera updates file information concerning a file including a sequence of data to be written as restoration file information, as shown in FIG. 1A.

Then in step S2, thus updated restoration file information concerning a file including a sequence of data is recorded to a recording medium together with the sequence of data.

Then in step S3, it is judged whether or not there exists data to be recorded, and in case there is data to be recorded, the processing returns to step S1 to repeat above-described steps. On the other hand, when data recording processing is finished, the processing goes to step S4, in which the file information of the data is finally recorded and the data writing processing is completed. Especially in the UDF, generally, after a sequence of data object is written, file information concerning the sequence of data is written following the data, details of which will be explained later. So, since file information and file system information are recorded to the end of the recording area, if writing processing of data object is not finished, writing processing of data to a recording medium such as an optical disc is not completed. That is, in case data writing processing to a recording medium is not completed, and file information, file system information, etc. are not written to the recording medium, the data cannot be read out.

In case an accident such as interruption of writing processing happens during the writing processing shown in FIG. 1A, the digital camera employing the present invention can cope with the accident by performing restoration processing shown in FIG. 1B. When interruption of recording processing due to discontinuance of drive power supply, uncovering of a cover arranged at a drive which veils a recording medium, impact, etc. is detected during the data recording step of step S2, the following restoration processing is initiated.

That is, in step S11 shown in FIG. 1B, latest restoration file information which is updated in step S1 shown in FIG. 1A is retrieved to be read out, and then in step S12, file information of a file which is interrupted during recording processing is restored based on the read out restoration file information. Finally, in step S13, thus restored file information is recorded following the file data whose writing processing is interrupted.

Even though writing processing is interrupted due to accidental factors when recording image data to a recording medium such as a CD-R, CD-RW, etc., under above-described restoration processing, the digital camera of the present invention can restore file information of data whose writing processing is interrupted based on restoration file information which is updated before writing data and written to a predetermined area of the recording medium, and read out data before the interruption of writing processing.

The UDF (Universal Disc Format) to which the digital camera conforms is one of standards to describe character codes of file names, file attributes, etc., which are mutually usable, for various media such as a CD-R (Compact Disc-Recordable), WORM (Write-Once Read-Many Optical Disc), CD-R/RW (Compact Disc-Recordable/Rewritable), MO (Magneto Optical Disc), and DVD (Digital Versatile Disc), and is established by the OSTA (Optical Storage Technology Association). That is, the UDF is a file system adopted to enable data exchange on every operating system (OS), and the digital camera of the present embodiment employs the sequential writing system of the UDF revision 1.50.

The UDF employs a File Entry ICB (File Entry Information Control Block) as its main data structure. In the UDF, each of all files and directories has a unique ICB. In the digital camera employing the present invention, generally, a file which stores actual data such as image data of a captured image is written before an ICB which defines the file. Thus, in case a file is divisionally written to a plurality of extents, the ICB can include the list of the extents.

In the UDF, sequential numbers for Virtual Reference are allocated to respective files as virtual addresses using a mapping table referred to as a VAT (Virtual Allocation Table). In a file system conforming to the ISO 9660 being an international standard, each file or directory on a recording medium is directly referred to using an actual address, while in the UDF, each file or directory is referred to using above-described virtual address. The VAT can be arranged at any place on tracks, and the VAT can be indicated by a VAT ICB which indicates the position of the VAT.

In case of employing the sequential writing system of the UDF revision 1.50, it is determined that the VAT ICB is necessarily arranged at a position returning from the final sector recorded on a recording medium by the Linking Area. The VAT ICB includes an extents list of the VAT which is divisionally arranged at a plurality of extents. So, in the UDF, even though a file is changed using a certain method, all of a sequence of file pointers do not have to be changed, and it is possible to reach the changed file by changing only the final VAT ICB.

Thus, in the UDF, by arranging the VAT between the FID and the File Entry ICB, even though the File Entry ICB is rewritten, the File Entry. ICB is processed as if it is virtually rewritten by changing the address of the File Entry ICB on the VAT.

In a file system conforming to the UDF, a write-once type recording medium is treated as a rewritable type recording medium.

Figure 2:
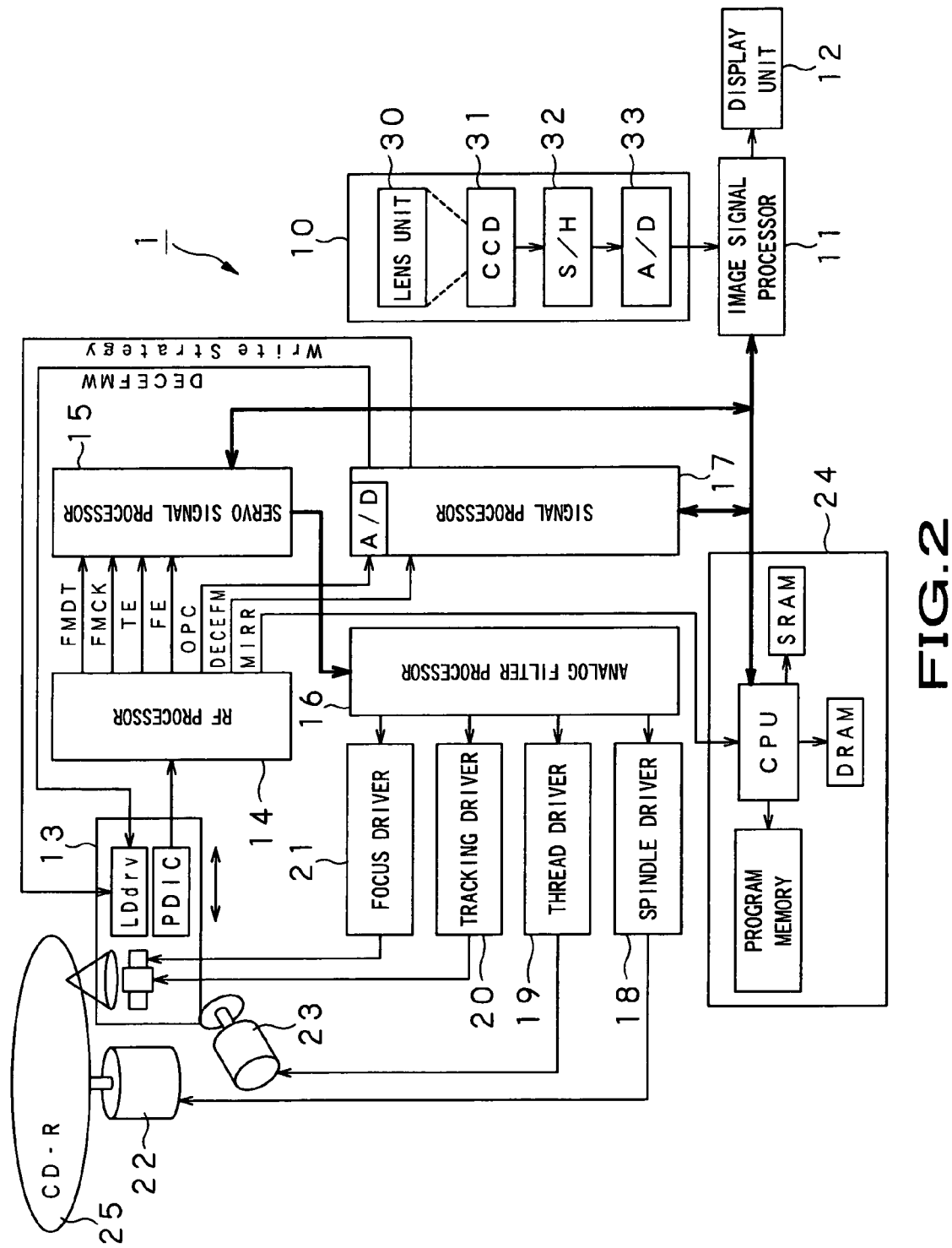
FIG. 2 shows a block diagram showing the specific configuration of the digital camera employing the present invention.

Next, the specific configuration of a digital camera as an apparatus for recording and reproducing data employing the present invention will be explained with reference to FIG. 2.

A digital camera 1 employing the present invention includes an image capturing unit 10 for capturing an object, an image signal processor 11 for performing conversion processing for image signals from the image capturing unit 10, a display unit 12 for displaying operation information used to operate the digital camera 1 and image signals, an OP (Optical Pickup) unit 13 for writing and/or reading out data to and/or from a recording medium to be described later, an RF processor 14 for performing RF processing for read out signals, a servo signal processor 15 for generating servo signals using various signals from the RF processor 14, an analog filter processor 16 for generating analog signals used to control respective drivers based on signals from the servo signal processor 15, a signal processor 17 for processing read out signals from a recording medium to be described later, a spindle driver 18 for controlling rotation of a spindle motor, a thread driver 19 for controlling operation of a thread motor, a tracking driver 20 for moving an objective lens of the OP unit 13, a focus driver 21 for perpendicularly moving the objective lens of the OP unit 13 toward a disc-shaped recording medium to control the focal point of a beam, a spindle motor 22 for driving a disc-shaped recording medium, a thread motor 23 for moving the OP Unit 13 along the radial direction of a disc-shaped recording medium, and a control unit 24 for controlling respective units, and the digital camera 1 writes and reads out captured image data to and from a recording medium 25. The digital camera employing the present invention is suitably provided with a detection sensor, not shown in FIG. 2, for detecting discontinuance of drive power supply, uncovering of a cover, impact, etc. during recording operation.

The image capturing unit 10 includes a lens unit 30 for capturing an image of an object, a charge coupled device (referred to as CCD, hereinafter) 31 for generating image signals, a sample-and-hold (referred to as S/H, hereinafter) circuit 32, an A/D conversion circuit 33 for converting image signals to digital signals. The CCD 31 generates image signals using an image of an object from the lens unit 30, and sends thus generated image signals to the S/H circuit 32. The S/H circuit 32 samples and holds image signals from the CCD 31, and sends thus sampled and held image signals to the A/D conversion circuit 33. The A/D conversion circuit 33 converts image signals from the S/H circuit 32 to digital signals, and sends thus converted digital signals to the image signal processor 11.

The image signal processor 11 performs image processing such as color basic form conversion from RGB signals to color difference signals and luminance signals, white balance, gamma correction, image reduction, and JPEG compression for digital image signals from the image capturing unit 10. Then, thus processed image signals are sent to the signal processor 17. Also, the image signal processor 11 sends thus processed image signals to the display unit 12.

The display unit 12 may be an LCD (liquid crystal display) and displays image signals from the image signal processor 11.

The OP unit 13 includes an objective lens, an LD (laser diode), a laser diode driver, a photo detect IC, a half mirror, etc., and detects optical signals and outputs thus detected optical signals to the RF processor 14. In recording data, the OP unit 13 writes data to the recording medium 25 based on flashing and drive signals (DECEFMW) of a laser, write strategy signals indicative of the optimum value of laser intensity and blinking from the signal processor 17 necessary in forming pits.

The RF processor 14 samples and holds eight type signals composed of beam signal, side, main detected by the OP unit 13 and performs operation for thus sampled and held signals to generate signals of such as FE (focus error), TE (tracking error), MIRR, ATIP (Absolute Time In Pregroove), and read out main signals from predetermined signals of the eight type signals. The RF processor 14, among thus generated signals, outputs FMDT (Frequency Modulation Data), FMCK (Frequency Modulation Clock), TE, and FE to the servo signal processor 15, and outputs OPC (Optical Power Calibration) signals of laser intensity detected by trial writing and flashing and drive signals (DECEFMW) of a laser to the signal processor 17, and outputs MIRR to the control unit 24.

The servo signal processor 15 receives FMDT (Frequency Modulation Data), FMCK (Frequency Modulation Clock), TE, and FE from the RF processor 14, and generates signals for controlling respective servo processing peculiar to an optical disc under the control of the control unit 24, and outputs thus generated signals to the analog filter processor 16.

The analog filter processor 16 generates analog signals from the signals for controlling respective servo processing from the servo signal processor 15, and outputs thus generated signals to the spindle driver 18, thread driver 19, tracking driver 20, and focus driver 21.

The signal processor 17 receives OPC and DECEFMW from the RF processor 14 under the control of the control unit 24, and performs processing such as CIRC decoding and encoding, write strategy, ADDr decoding, asymmetry calculation, running OPC, etc. In writing data to a recording medium, the signal processor 17 outputs flashing and drive signals (DECEFMW) of a laser, write strategy signals indicative of the optimum value of laser intensity to the OP unit 13.

The spindle driver 18 controls rotation of the spindle motor 22 based on signals from the analog filter processor 16.

The thread driver 19 controls thread operation of the thread motor 23 based on signals from the analog filter processor 16.

The tracking driver 20 moves the OP unit 13 based on signals from the analog filter processor 16 to control the position of a beam spot formed when a laser beam is radiated onto the disc surface of the recording medium 25.

The focus driver 21 perpendicularly moves the OP unit 13 toward the disc surface of the recording medium 25 based on signals from the analog filter processor 16 to control the focal point of a laser beam.

The spindle motor 22 rotates a recording medium based on signals form the spindle driver 18.

The thread motor 23 performs thread operation of the OP unit 13 based on signals form the thread driver 19.

The control unit 24 includes a program memory for storing a program, a DRAM (Dynamic Random Access Memory) for storing the FID and VAT, a non-volatile memory such as a ROM or an EPROM, and a CPU, and controls the whole operation of the digital camera 1. Other than this, mainly, in recording a sequence of data such as image data, the control unit 24 records file information concerning a file including the sequence of data to a predetermined area of a recording medium as restoration file information.

When data writing processing is interrupted, the control unit 24 retrieves and reads out restoration file information, and restores a file whose recording processing is interrupted based on the restoration file information. Specifically, the control unit 24 adds file information such as the File Entry ICB, VAT, etc. of a file to an extent writing processing of which is not completed due to interruption of recording processing.

The control unit 24 temporarily stores a table for relating the File Entry ICB and the VAT to the DRAM and the non-volatile memory. Also, the control unit 24 wholly controls respective units. Specifically, the DRAM stores the latest VAT extracted from a recording medium and real addresses on the recording medium from which virtual partition starts as a correspondence table. When a file or a directory is updated, added, or deleted, the DRAM stores the correspondence table of the VAT, which is updated correspondingly, and the real addresses on the recording medium from which the virtual partition starts until just before the main power of the digital camera 1 is turned off. Also, during the period when the main power of the digital camera 1 is off, the non-volatile memory continuously retains contents which are stored in the DRAM until just before the main power of the digital camera 1 is turned off. The operation of storing above-described correspondence table to the DRAM and the non-volatile memory will be explained later.

The recording medium 25 is a disc-shaped recording medium such as a CD-R or a CD-/RW to/from which data is written/read out based on a file system conforming to the UDF.

Next, the operation of respective units of the digital camera 1 having above-described functions as a digital camera in reading out signals recorded on the recording medium 25 will be explained.

The laser diode radiates a light, and the light is reflected by the disc surface of the recording medium 25 and then read out by an optical lens system of the OP unit 13. The light from the optical lens system is converted to electrical signals by a PDIC (photo detect IC), and thus converted electrical signals are sampled and held in the RF processor 14, and the RF processor 14 generates signals of such as FE (focus error), TE (tracking error), MIRR, ATIP (Absolute Time In Pregroove), and read out main signals from predetermined signals of the eight type signals by performing operation.

Firstly, focus error signals obtained by the RF processor 14 has their property adjusted by the servo signal processor 15 (Digital Servo Processor), and are sent to the focus driver 21 through the analog filter processor 16 (Analog Filter Block). The focus driver 21 moves a lens drive focus coil, not shown, of the OP unit 13 upward and downward to correct error of focus.

Similarly, tracking error signals obtained by the RF processor 14 has their AC components taken out by the servo signal processor 15 (Digital Servo Processor), and undergo digital filter processing. Then, thus processed signals are sent to the tracking driver 20 through the analog filter processor 16. The tracking driver 20 finely moves a lens drive tracking coil of the OP unit 13 along the radial direction to correct error of tracking.

Tracking error signals obtained by the RF processor 14 has their DC components taken out by the servo signal processor 15, and undergo digital filter processing. Then, thus processed signals are sent to the thread driver 19 through the analog filter processor 16. The thread driver 19 operates the thread motor 23, and moves the whole OP unit 13 along the radial direction of a recording medium to correct error of thread operation. At the time of seek operation, thread control voltage is intentionally applied from outside so as to drive the thread motor compulsorily.

As has been described above, tracking operation, is performed to finely move only the lens along the radial direction based on the AC components of the tracking error signals, and thread operation is performed to move the whole OP unit 13 along the radial direction based on the DC components of the tracking error signals.

Since detection signals (MIRR) of reflectance variation of a recording medium output from the RF processor 14 is detected when the OP unit 13 crosses tracks, the CPU detects current seek position and read out position and starts and stops optical picking up operation by counting the MIRR.

The spindle motor 22 is controlled based on the ATIP (Absolute Time In Pregroove) processing. Temporal information is recorded to winding grooves referred to as wobble grooves formed on a recording medium by FM modulation of ±1 kHz with center frequency of 22.05 kHz along the radial direction. Temporal information referred to as the ATIP (Absolute Time In Pregroove) is modulated in Bi-Phase modulation.

When focus and tracking operation is correctly performed, the RF processor 14 takes out wobble signals from predetermined combinations of received eight type signals. The wobble signals undergo FM demodulation and ATIP decoding, and are taken out as clock signals (FMCK) corresponding to the center frequency and temporal information (FMDT).

The FMDT is stored at an absolute time position of a medium, that is, at a predetermined register classified as an address and other additional information by the servo signal processor 15 (Servo Processor). Accordingly, the CPU reads out the FMDT via a bus.

At the reading out operation, a signal corresponding to a recording pit is taken out from predetermined combinations of eight type signals at the RF processor 14, and undergoes equalizing processing, and is sent to the signal processor 17 with its signal state remaining in the form of the EFM (Eight to Fourteen Modulation). Then, the signal processor 17 performs decoding processing for the signal based on the CIRC (Cross Interleave Reed-Solomon Code) to obtain desired data.

Next, writing operation will be explained. In writing operation, firstly, a pickup is moved to the lead-in area to read out the ATIP information. Then, special information 2 is read out to detect the start position of the lead-in area. Generally, the start position is stored as temporal information. The information written in the special information 2 corresponds to an individual identification code of a recording medium.

A read out apparatus for a recording medium stores write strategy parameter corresponding to the individual identification code and external associated parameter as a table in advance. The write strategy is a technique to correct a laser pulse at writing processing every pit along the time direction and level direction so that the pit size after the writing processing fulfills the specification. A correction parameter is prepared for each recording medium in advance.

Next, OPC (Optical Power Calibration) operation to determine the optimum value of laser output is performed. Above-described write strategy finely controls a laser every writing pit, while the OPC calculates the optimum value of the whole. Performing the OPC, setting value for writing corresponding to an ideal read out desired value can be obtained.

In writing data, after performing CIRC or EFM encoding in a signal processor for compressed captured image data prepared in a RAM, flashing and drive signals (DECEFMW) of a laser and write strategy signals necessary in forming pits are input to a laser driver of the OP unit 13. At this time, writing processing is performed by setting the timing to a predetermined position in accordance with a file system with an address of a frame unit obtained from the FMDT signals, which is obtained by decoding the ATIP, being a reference. At initial writing, writing processing starts from a position skipping by an area of approximately 20 Mbyte being the lead-in area at the time of later closed session.

Figure 3:
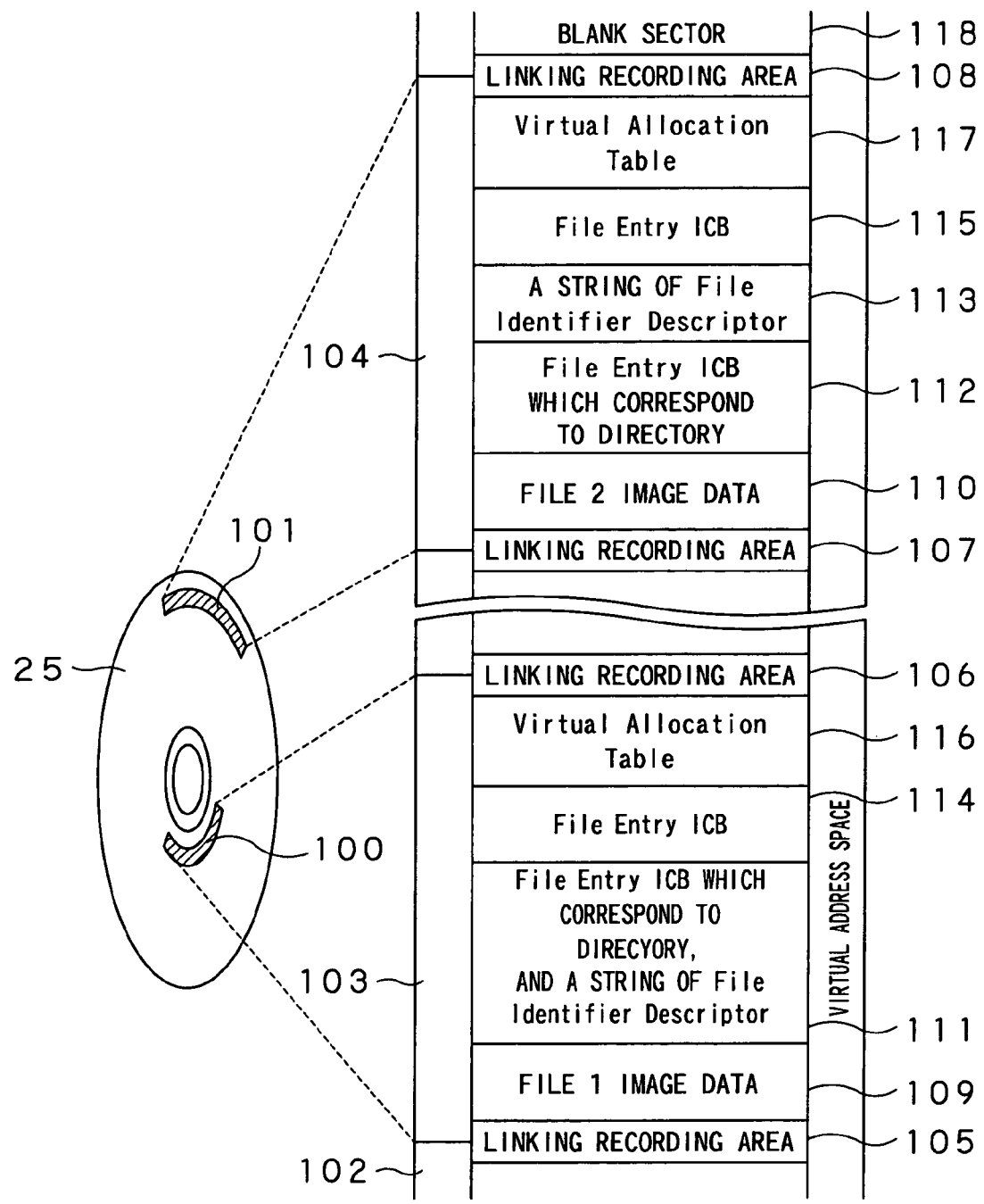
FIG. 3 shows a schematic view showing a virtual address space of data which is recorded by the digital camera employing the present invention.

Next, the manner of writing captured image data to a recording medium in shooting an object using the digital camera 1 will be explained with reference to FIG. 3. In FIG. 3, following Nth shooting, image data of (N+X)th shooting is written to the recording medium 25 just after the (N+X)th shooting.

In shooting operation, a laser beam scans the disc surface of recording medium 25 helically from the inner circumference to the outer circumference with the disc center being the scanning axis, and captured image data packets are recorded in the form of pits.

Physical areas 100 and 101 show areas where image data corresponding to the Nth and the (N+X)th shooting is written, respectively. In FIG. 3, the Nth image data is written to an inner circumference of the disc, and the (N+X)th image data is written to an outer circumference of the disc.

The configuration of packet data of captured image to be written to the recording medium 25 will be explained with reference to FIG. 3. A volume 102 shows that the Nth to (N+X)th image data written to a recording area from the inner circumference to the outer circumference of the recording medium 25 is recorded to a virtual address space in a sequential order, indicating a virtual zone (virtual partition) of the UDF to which captured image data is to be written.

Thus, the direction advancing from the Nth image data 103 to the (N+X)th image data 104 corresponds to the direction of tracks which advances from the inner circumference to the outer circumference on the recording medium 25.

Linking areas 105, 106, 107, and 108 generally have seven blocks respectively, which work as linking recording areas being linking areas between adjacent packets.

A segment 109 is a file object including Nth shot image data, and a segment 110 is a file object including (N+X)th shot image data.

In the file system hierarchy, a segment 111 includes the File Entry ICB which corresponds to a directory to which the file object of the Nth image data included in the segment 109 belongs, and a string of the File Identifier Descriptor (FID). The File Identifier Descriptor includes identification character string information, etc. to identify a specific file.

A segment 112 includes only the File Entry ICB which corresponds to a directory to which the file object of the (N+X)th image data included in the segment 110 belongs. Also, a segment 113 includes a string of the File Identifier Descriptor. Thus, in case the number of the File Identifier Descriptor is large, as shown in the segment 112 and segment 113, a string of the File Identifier Descriptor are stored in a logical block different from that in which the File Entry ICB is stored.

A segment 114 and a segment 115 include File Entry ICB (Information Control Block) respectively, which includes the position of a file object, date information of forming and updating a file, permission information, etc. The position of the File Entry ICB can be indicated by the File Identifier Descriptor which biuniquely corresponds to the File Entry ICB. In relating the File Entry ICB and the File Identifier Descriptor, generally, address reference expression to a virtual space is used.

A segment 116 includes the Virtual Allocation Table of the UDF and the Virtual Allocation Table ICB (VAT ICB). They store information for relating a virtual address in a virtual zone of the UDF being a virtual address space and an actual logical block address on a recording medium, and the VAT and the VAT ICB can be updated when a file object is added or changed.

A segment 117 includes the latest VAT concerning packet data of the finally shot (N+X)th image. Segments after a segment 118 show blank sectors of the recording medium 25.

In FIG. 3, sessions including shot image data are not closed, and data can be additionally recorded thereto.

In the UDF, in case the data size of image data to be recorded is large, such as non-compressed still picture data or moving picture data having high resolution, a file is divisionally recorded to a plurality of extents. An extent is a string which consists of successive logical sectors, and data capacity of one extent is set to be such as 1 megabyte in advance at the UDF revision 1.50. The address of an extent is indicated by a logical sector number located at the head of the extent. The logical sector numbers are allocated in the order of successive ascending sequence.

FIGS. 4A to 4C show schematic views of extents which are composed of logical sectors to which file data is divisionally recorded. FIG. 4A shows arrangement of a case in which writing processing is normally performed, indicating extents, above-described File Entry ICB, File Identifier Descriptor, VAT, VAT ICB, while FIG. 4B shows arrangement of a case in which writing processing after an extent Ex3 is interrupted due to accidental factors during data writing. FIG. 4C shows the state in which file information such as the File Entry ICB, File Identifier Descriptor, VAT, VAT ICB is restored from the state in which writing processing is interrupted.

In the embodiment, data of large file size is divisionally recorded to extents composed of a plurality of logical sectors, and restoration file information is recorded for each extent. The restoration file information is recorded to the head of each extent.

In the digital camera 1 of the embodiment, restoration file information is recorded with restoration file information of previous extent included therein. Specifically, in step S2 shown in FIG. 1, restoration file information to be recorded to an extent includes an address and size of previous extent which has been already recorded.

That is, it is assumed that a file is divisionally recorded to four extents of extent Ex1, extent Ex2, extent Ex3, and extent Ex4. In this case, when the extent Ex1 is written to a recording medium, a head address and file size of the extent Ex1 is recorded to a recording medium as restoration file information together with data to be recorded. Then, when the next extent Ex2 is additionally recorded, the head address and file size of the extent Ex1 and a head address and file size of the extent Ex2 are recorded to a recording medium as restoration file information together with data to be recorded.

Furthermore, when the extent Ex3 is recorded, the head address and file size of the extent Ex1 and extent Ex2, and those of extent Ex3 are recorded to a recording medium as restoration file information together with data to be recorded.

In case writing processing is interrupted when restoration file information is recorded together with data to be recorded, as shown in FIG. 4B, finally updated restoration file information is retrieved, and file information is written following the interrupted extent based on file information included in the retrieved restoration file information.

That is, as shown in FIG. 4C, in case writing processing is interrupted at the extent Ex3, finally updated restoration file information is retrieved from extents which have been already recorded. In this case, restoration file information recorded in the extent Ex2 together with data is read out, and file information such as the head address and file size is written following the interrupted extent based on file information recorded in the read out restoration file information.

As restoration file information, there are enumerated a file name of an extent to which restoration file information is written, directory information of a file, File Entry ICB, VAT. Furthermore, other information can be used as restoration file information as long as the information shows characteristics of data file.

Thus, according to the digital camera 1 of the present invention, even though there is raised an accident that file information is damaged due to interruption of writing processing, or that file information which should be written after a file object is not recorded, data before the interruption can be read out by retrieving previously updated restoration file information and restoring and recording file information based on thus retrieved restoration file information. Thus, the restoration method is extremely effective in writing image data of large data size such as, especially, a moving picture file or a non-compressed still picture image.

While the invention has been described hereinbefore, it should be understood by those ordinarily skilled in the art that the invention is not limited to above-described embodiments, but various modifications, alternative constructions or equivalents can be implemented without departing from the scope and spirit of the present invention. For example, the present invention can be adapted not only to the WORM type recording medium but also to the rewritable type recording medium, and the recording medium is not limited to a CD-R, CD-RW, etc., and an optical disc such as a CD-R/RW (Compact Disc-Recordable/Rewritable), a DVD-RW (Digital Versatile Disc-Rewritable), a DVD-RAM, etc., and a magneto optical disc such as an MO (Magneto Optical Disc), an MD (Mini Disc) can be used.

The present invention is not limited to above-described preferred embodiments thereof illustrated in the accompanying drawings and described in the above description in detail, and it should be understood by those ordinarily skilled in the art that various modifications, alternative constructions or equivalents can be implemented without departing from the scope and spirit of the present invention as set forth and defined by the appended claims.

INDUSTRIAL APPLICABILITY

As in the above, according to the present invention, there is provided an apparatus for recording and reproducing data which manages files and records and/or reproduces data based on a virtual allocation table showing correspondence between actual addresses indicative of recording positions of the files on a recording medium and virtual addresses indicative of virtual recording positions of the files, the files having a sequence of data stored therein, the apparatus including: record and reproduction means for recording and/or reproducing data to and/or from the recording medium; and record control means for controlling the processing of recording file information concerning a file including a sequence of data to a predetermined area of the recording medium as restoration file information when the record and reproduction means records the sequence of data; wherein, when interruption of data recording processing is detected, the record control means retrieves and reads out restoration file information, and restores a file whose recording processing is interrupted based on the restoration file information.

According to the apparatus for recording and reproducing data, since file information concerning a file including a sequence of data is recorded to a predetermined area of the recording medium as restoration file information, even though there is raised failure in writing data, data before the interruption can be made readable.

Furthermore, according to the present invention, there is provided a method for recording and reproducing data which manages files and records and/or reproduces data based on a virtual allocation table showing correspondence between actual addresses indicative of recording positions of the files on a recording medium and virtual addresses indicative of virtual recording positions of the files, the files having a sequence of data stored therein, the method including: data record and restoration file information record step of recording a sequence of data, and recording file information concerning a file including the sequence of data to a predetermined area of the recording medium as restoration file information; restoration file information read out step of retrieving and reading out restoration file information when data recording processing is interrupted at the data record step; and file restoration step of restoring a file whose recording processing is interrupted based on the restoration file information.

According to the method for recording and reproducing data, since file information concerning a file including a sequence of data is recorded to a predetermined area of the recording medium as restoration file information, even though there is raised failure in writing data, data before the interruption can be made readable by reading out the restoration file information.

Furthermore, according to the present invention, there is provided a digital camera including: image capturing means for capturing an object; image processing means for processing captured image data; record and reproduction means for recording and/or reproducing data to and/or from a recording medium; and record control means for managing files having a sequence of data stored therein based on a virtual allocation table showing correspondence between actual addresses indicative of recording positions of the files on the recording medium and virtual addresses indicative of virtual recording positions of the files, and controlling the processing of recording file information concerning a file including a sequence of data to a predetermined area of the recording medium as restoration file information when the record and reproduction means records the sequence of data; wherein, when interruption of data recording processing is detected, the record control means retrieves and reads out restoration file information, and restores a file whose recording processing is interrupted based on the restoration file information.

According to the digital camera, since file information concerning a file including a sequence of data is recorded to a predetermined area of the recording medium as restoration file information, even though there is raised failure in writing data, data before the interruption can be made readable.

The invention claimed is:

1. An apparatus for recording and reproducing data which manages files and records and/or reproduces data based on a virtual allocation table showing correspondence between actual addresses indicative of recording positions of the files on a recording medium and virtual addresses indicative of virtual recording positions of the files, the files having a sequence of data stored therein, the apparatus comprising:
   record and reproduction means for recording and/or reproducing data to and/or from the recording medium; and
   record control means for controlling the processing of recording divisionally the sequence of data to a logical sector string composed of a plurality of logical sectors and recording at least a piece of restoration file information for every logical sector string or for a plurality of logical sector strings to a predetermined area of the recording medium as restoration file information, when the record and reproduction means records the sequence of data;
   wherein, when interruption of data recording processing is detected, the record control means retrieves and reads out restoration file information, and restores a file whose recording processing is interrupted based on the restoration file information.

2. The apparatus for recording and reproducing data as set forth in claim 1, wherein the record control means restores a file based on restoration file information of a logical sector string which is recorded just before interruption of data recording processing.

3. The apparatus for recording and reproducing data as set forth in claim 1, wherein the restoration file information includes a logical sector number located at the head of a logical sector string.

4. The apparatus for recording and reproducing data as set forth in claim 1, wherein the restoration file information includes restoration file information of up to previous logical sector string.

5. The apparatus for recording and reproducing data as set forth in claim 1, wherein the restoration file information includes a file name and directory information of the file.

6. The apparatus for recording and reproducing data as set forth in claim 1, wherein the restoration file information includes addresses of a final virtual allocation table which is normally recorded.

7. The apparatus for recording and reproducing data as set forth in claim 1, wherein the files are managed based on the Universal Disc Format established by the OSTA (Optical Storage Technology Association).

8. The apparatus for recording and reproducing data as set forth in claim 7, wherein the virtual allocation table is a Virtual Allocation Table conforming to the Universal Disc Format.

9. A method for recording and reproducing data which manages files and records and/or reproduces data based on a virtual allocation table showing correspondence between actual addresses indicative of recording positions of the files on a recording medium and virtual addresses indicative of virtual recording positions of the files, the files having a sequence of data stored therein, the method comprising:
   data record and restoration file information record step of divisionally recoding the sequence of data to a logical sector string composed of a plurality of logical sectors and recording at least a piece of restoration file information for every logical sector string or for a plurality of logical sector strings to a predetermined area of the recording medium as restoration file information;
   restoration file information read out step of retrieving and reading out restoration file information when data recording processing is interrupted at the data record step; and
   file restoration step of restoring a file whose recording processing is interrupted based on the restoration file information.

10. The method for recording and reproducing data as set forth in claim 9, wherein, in the restoration file information read out step, a file is restored based on restoration file information of a logical sector string which is recorded just before interruption of data recording processing.

11. The method for recording and reproducing data as set forth in claim 9, wherein the restoration file information includes a logical sector number located at the head of a logical sector string.

12. The method for recording and reproducing data as set forth in claim 9, wherein the restoration file information includes restoration file information of up to previous logical sector string.

13. The method for recording and reproducing data as set forth in claim 9, wherein the restoration file information includes a file name and directory information of the file.

14. The method for recording and reproducing data as set forth in claim 9, wherein the restoration file information includes addresses of a final virtual allocation table which is normally recorded.

15. The method for recording and reproducing data as set forth in claim 9, wherein the files are managed based on the Universal Disc Format established by the OSTA (Optical Storage Technology Association).

16. The method for recording and reproducing data as set forth in claim 15, wherein the virtual allocation table is a Virtual Allocation Table conforming to the Universal Disc Format.

17. A digital camera comprising:
   image capturing means for capturing an object;
   image processing means for processing captured image data;
   record and reproduction means for recording and/or reproducing data to and/or from a recording medium; and
   record control means for managing files having a sequence of data stored therein based on a virtual allocation table showing correspondence between actual addresses indicative of recording positions of the files on the recording medium and virtual addresses indicative of virtual recording positions of the files, and controlling the processing of recording divisionally the sequence of data to a logical sector string composed of a plurality of logical sectors and recording at least a piece of restoration file information for every logical sector string or for a plurality of logical sector strings to a predetermined area of the recording medium as restoration file information, when the record and reproduction means records the sequence of data;
   wherein, when interruption of data recording processing is detected, the record control means retrieves and reads out restoration file information, and restores a file whose recording processing is interrupted based on the restoration file information.

18. The digital camera as set forth in claim 17, wherein the files are managed based on the Universal Disc Format established by the OSTA (Optical Storage Technology Association).

* * * * *